United States Patent [19]

McDonald et al.

[11] E Patent Number: Re. 33,195

[45] Reissued Date of Patent: Apr. 10, 1990

[54] FABRICS FOR PAPERMAKING MACHINES

[75] Inventors: Robert L. McDonald; Frank Biasone, both of Appleton, Wis.

[73] Assignee: Asten Group, Inc., Charleston, S.C.

[21] Appl. No.: 170,403

[22] Filed: Jul. 21, 1980

Related U.S. Patent Documents

Reissue of:

[64] Patent No.: 4,184,519
Issued: Jan. 22, 1980
Appl. No.: 931,290
Filed: Aug. 4, 1978

[51] Int. Cl.[4] ..... D03D 15/00; D21F 1/10; B01D 39/10

[52] U.S. Cl. ..... 139/425 A; 139/383 A; 162/DIG. 1

[58] Field of Search ..... 139/425 A, 425 R, 383 A, 139/420 C; 162/DIG. 1, 360; 245/2, 8

[56] References Cited

U.S. PATENT DOCUMENTS

| | | | |
|---|---|---|---|
| 1,927,498 | 9/1933 | Lindsay et al. . | |
| 2,755,021 | 7/1956 | Henke . | |
| 2,903,021 | 9/1959 | Holden et al. . | |
| 3,139,119 | 6/1964 | Buchanan . | |
| 3,143,150 | 8/1964 | Buchanan . | |
| 3,159,530 | 12/1964 | Heller et al. . | |
| 3,211,606 | 10/1965 | Watson . | |
| 3,421,230 | 1/1969 | Ward . | |
| 3,858,623 | 1/1975 | Lefkowitz | 139/425 A |
| 3,915,202 | 10/1975 | Curtis et al. | 139/425 A |
| 4,112,982 | 9/1978 | Bugge et al. | 139/425 A |
| 4,157,276 | 6/1979 | Wandez et al. | 139/425 A |
| 4,161,195 | 7/1979 | Khan | 139/383 A |
| 4,171,009 | 10/1979 | Karm | 139/425 A |

OTHER PUBLICATIONS

*Grammar of Textile Design,* by H. Nisbet; 3rd Edition, Revised and Enlarged, D. Van Nostrand Co., Inc. New York, pp. 52 & 56.

Monel Wire Screen and Filter Cloth-Bulletin H-3 6M 7-38, The International Nicker Co., Inc., 67 Wall St., New York, N.Y., p. 7 relied on.

*Textile Design and Colour,* by William Watson, published by Longmans, Green & Co., 39 Paternoster Row, London 1912, pp. 5-6 relied on.

*Primary Examiner*—James Kee Chi

*Attorney, Agent, or Firm*—Volpe and Koenig

[57] ABSTRACT

A fabric, adapted for use in a belt of a papermaking machine, is formed of interwoven machine direction wrap and cross-machine direction shute type strands, at least the shute strands being woven in a repetitive pattern of passing over at least three adjacent warp strands and then passing under at least two adjacent warp strands so as to form a 3/2 type weave pattern.

13 Claims, 1 Drawing Sheet

FABRICS FOR PAPERMAKING MACHINES

Matter enclosed in heavy brackets [ ] appears in the original patent but forms no part of this reissue specification; matter printed in italics indicates the additions made by reissue.

BACKGROUND OF THE INVENTION

The present invention relates generally to fabrics for use on papermaking machines and more particularly to Fourdrinier, or forming fabrics.

In the manufacture of sheetlike structures of materials such as paper, kraft, board, pulp, asbestos and the like, it is common practice to utilize a Fourdrinier papermaking machine having an endless belt of a generally flat fabric formed from woven metal wires or synthetic polymeric yarns of materials such as polyamides, polyesters and the like. The synthetic yarns can be either monofilament or multifilament yarns.

In operation of the machine, an aqueous suspension of pulp fibers is deposited onto the moving forming fabric. As the forming fabric travels, some of the water content of the suspension drains through the porous fabric so as to form a generally self-supporting continuous web of material. The drainage of the water through the belt may be assisted by mechanisms such as suction boxes or the like. As the web reaches the end of the belt, the web is "picked up" from the forming fabric and is subsequently subjected to a series of rolling and drying operations to yield the final sheet-like product.

The woven forming fabric of the papermaking machine must possess a variety of characteristics to properly function in the papermaking process. The forming fabric should be sufficiently fluid permeable so as to allow for the drainage of water from the fiber suspension but sufficiently closed so as to prevent the passage of significant amounts of fibers contained in the suspension. Since the forming fabric is under tension and is subjected to bending as it passes over the rolls, the strength and resistance to fatigue and wear of the fabric must be high so as to insure the longest possible working life. In addition, the strands of fabric should be dimensionally stable relative to one another so that the fabric will not have varying drainage characteristics which can affect the uniformity of the final product.

Various types of weaving patterns for forming fabrics for use in papermaking machines are known in the art. Generally these patterns have the identical symmetry in the warp and shute directions. For example, U.S. Pat. No. 3,858,623 to Lefkowitz discloses a prior art pattern wherein the warp and weft, or shute, yarns pass over one yarn, beneath the two adjacent yarns and then over the next yarn. For convenience, this pattern may be referred to as a one-two type pattern. The above-mentioned patent further discloses another pattern for papermaking machine fabrics which can be defined as a one-three type pattern. In addition, U.S. Pat. No. 3,211,606 to Watson discloses a papermaking fabric of woven wires having a repetitive four strand, two-two type pattern and U.S. Pat. No. 1,927,498 to Lindsay discloses a one-two type pattern for a woven metal wire belt for a papermaking machine. Similar types of papermaking fabrics are also disclosed in U.S. Pat. Nos. 2,903,201 to Halden et al, 2,755,047 to Henke, 3,139,119 to Buchanan, 3,143,150 to Buchanan, 3,159,530 to Heller et al and 3,421,230 to Ward.

Various problems are associated with the use of the above-mentioned fabrics as belts in papermaking machines. For example, the fabric having the so-called one-three type of repetitive pattern in the weave tends to have one relatively smooth surface and one relatively rough surface. Such fabric tends to have relatively short life when run with the smooth surface against the suction boxes. For example, the one-three type fabrics that are used in the production of heavier papers typically only have a usable life of about thirty days at normal production speeds. The smoother surface of the fabric also tends to erode the covers of the suction box in a papermaking machine which therefore requires frequent grinding of the covers to maintain adequate suction of the belt. Furthermore, such fabrics do not allow the dewatered web to be "picked up" or released easily from the smoother surface when they are run with the rougher surface against the suction box covers. The same problems are encountered to a greater or lesser extend in the use of the other fabric weave types such as a two-two or a one-two. These other fabric weave types also may have inadequate drainage characteristics.

SUMMARY OF THE INVENTION

It, therefore, is an object of the present invention to provide a fabric adapted for use as a forming fabric in a papermaking machine which has a longer useful life, allows for increased output from the machine and significantly reduces the necessity for grinding the covers of the suction boxes of the machine.

A further object of the present invention is to provide a fabric for papermaking machines which has good drainage characteristics. Another object of the present invention is to provide a fabric, which when used in a papermaking machine, has good "pick up" or release characteristics.

It has been found that these objectives of the present invention can be achieved by employing a forming fabric that has a two-three type weave pattern or a pattern having a greater number of threads included in the repetitive weave.

More specifically, these objects are achieved by using a forming fabric made in accordance with the present invention that has interwoven warp and shute strands of material, each warp strand extending transversely to the shute strands and at least one of the types of strands woven in a repetitive pattern of passing over a group of at least three adjacent strands of the other type and then passing under a group of at least two adjacent strands of the other type.

Preferably both types of strands of the fabric are woven in a repetitive pattern wherein each shute strand is in a repetitive pattern of passing under a group of three adjacent warp strands and passing over a group of two adjacent warp strands next to the group of three warp strands and each warp strand is in a repetitive pattern of passing over a group of three adjacent shute strands and passing under two adjacent shute strands next to the group of three shute strands.

Further objects, advantages and features of the present invention will become more fully apparent from a detailed consideration of the arrangement and construction of the constituent parts as set forth in the following specification taken together with the accompanying drawing.

DETAILED DESCRIPTION OF THE PREFERRED EMBODIMENTS

Figure 1:
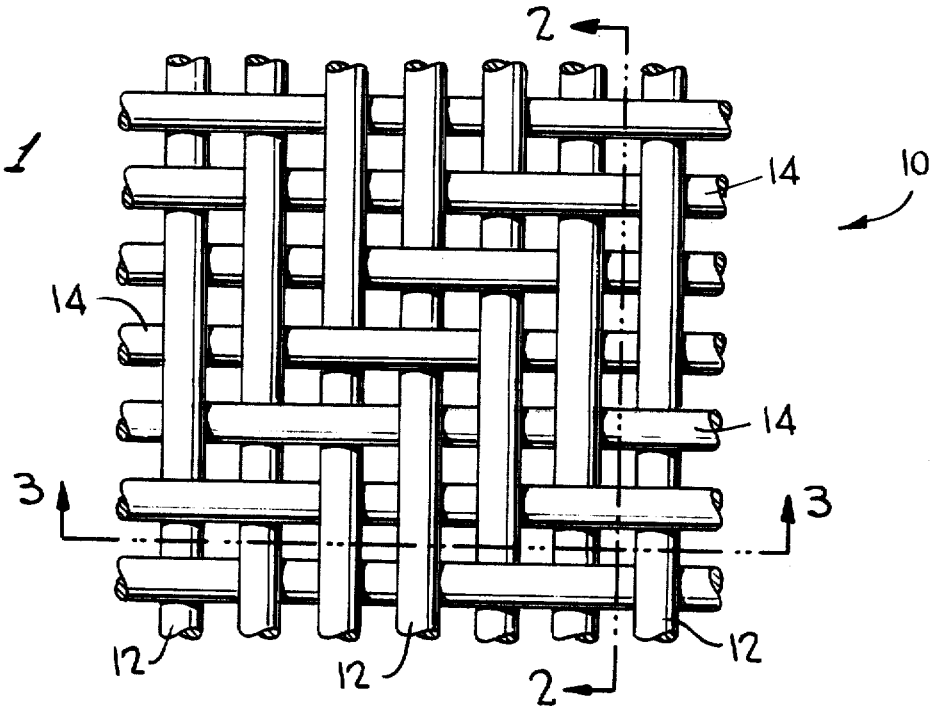
FIG. 1 is an enlarged fragmentary plan view of a papermaking fabric in accordance with the present invention.

Referring to the drawings, there is shown a papermaking fabric portion 10 in accordance with the present invention. Fabric 10 comprises warp strands 12 and shute strands 14 of suitable material such as metallic wire or synthetic polymeric monofilament. It is preferable that strands 12 and 14 are all of the same type material such as polyester or polyamide monofilament although the fabric of the present invention may be workable with strands of different materials.

Warp strands 12 and shute strands 14 of fabric 10 are woven in a repetitive five shed weaving pattern such that each strand passes over or under a group of three adjacent strands and then passes over or under an adjacent group of two adjacent strands. Adjacent parallel strands are offset one strand in the repetitive pattern so that a twill type fabric is produced, i.e., a fabric woven so as to have an appearance of diagonal lines. This offset may be defined as each warp or shute type strand of the fabric, in each repetitive pattern, passes over or under only two strands of the group of three adjacent strands passed over or under by an adjacent parallel strand of the same type.

Figure 2:
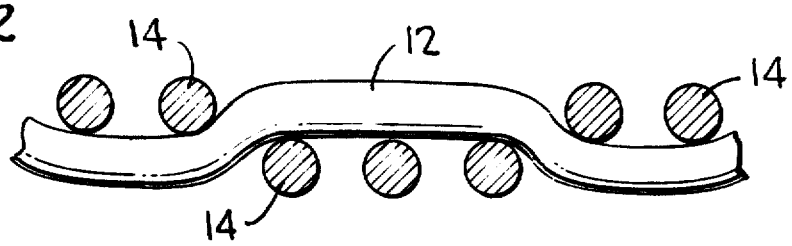
FIG. 2 is a cross-sectional view of the fabric of FIG. 1 taken along line 2—2, thereof
Figure 3:
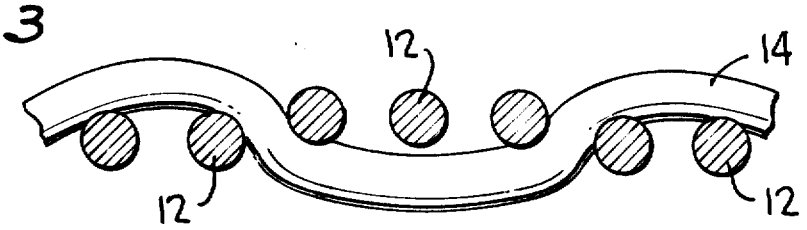
FIG. 3 is a cross-sectional view of the fabric taken along line 3—3 of FIG. 1.
Figure 1:
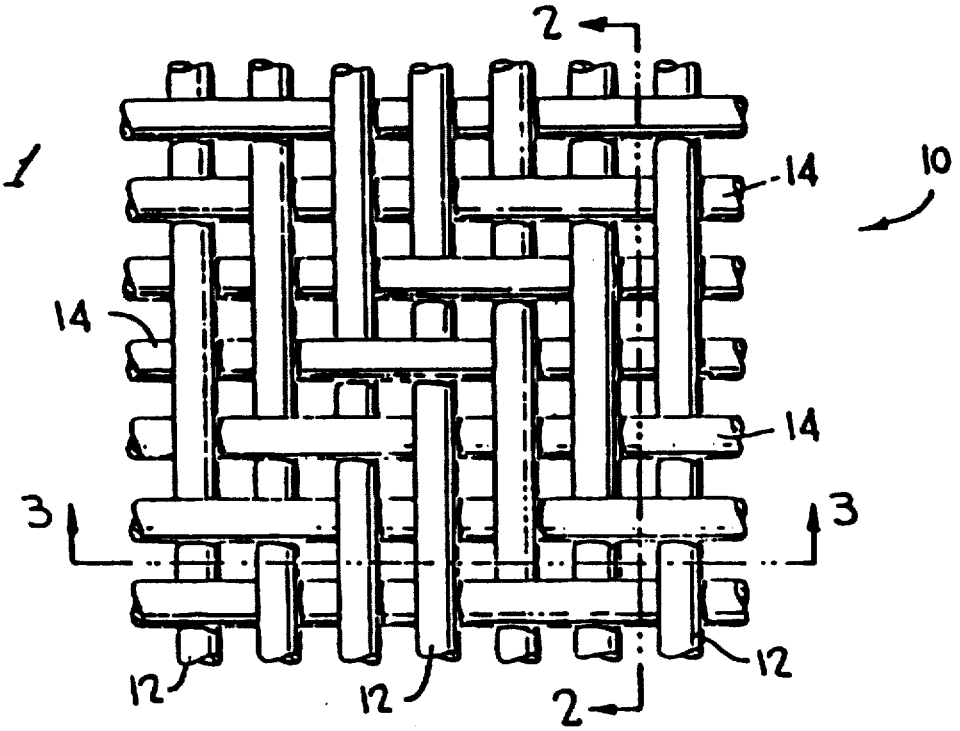
Figure 2:
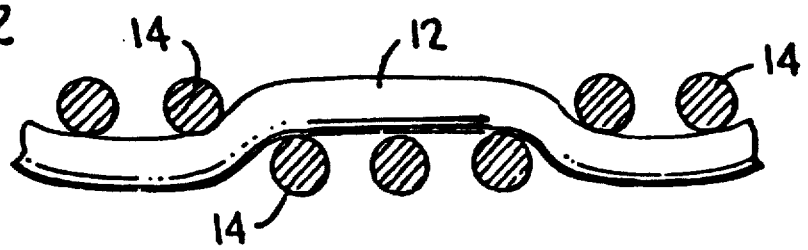
Figure 3:
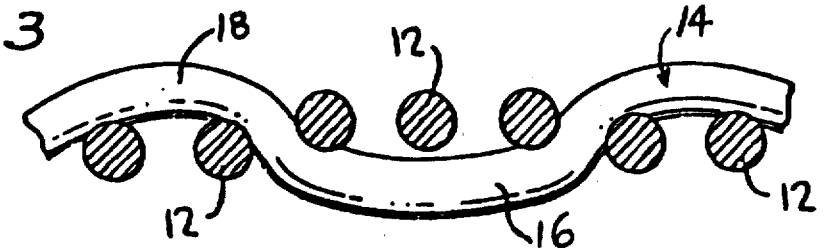

The weave pattern is more clearly illustrated in FIGS. 2 and 3. In FIG. 2, warp or machine directional strand 12 sequentially passes under a group of two adjacent shute or cross-machine directional strands 14, passes over a group of three adjacent shute strands and then passes under a group of two more adjacent shute strands, etc. In FIG. 3, a shute or cross-machine strand 14 passes over a group of two warp or machine directional strands 13, beneath a group of three adjacent warp strands and then over two more adjacent warp strands, etc. It should be noted that warp or machine direction strands and shute or cross machine direction strands also described apply to flat woven fabric. In endless woven fabric the shute strands are machine direction and the warp strands are cross machine direction. As is apparent from an examination of FIG. 1, each strand of the fabric, in each repetitive pattern for that strand, passes over only two of the three transverse strands passed over by the adjacent parallel strand.

While the terms "over" and "under" have been used to describe the manner in which the warp and shute strands are interwoven relative to each other, it should be realized that the terms are only relative to the particular orientation of the woven fabric. Therefore, as used herein, the terms are used for convenience and clarity of description and are intended to only indicate the relative position of a strand to a transverse strand or strands.

In a presently preferred fabric woven in the pattern as shown in FIGS. 1–3, each cross machine direction strand 14 has a slightly larger diameter than the diameter of each machine direction strand 12. Preferably, machine direction strand 12 has an average diameter of about 0.004 to about 0.030 inches and each cross machine direction strand 14 has an average diameter of about 0.0045 to about 0.035.

In a preferred use of fabric 10 shown in FIGS. 1–3, the fabric is oriented on a papermaking machine such that shute strands 14 are in the cross-machine direction and the surface of the fabric having the knuckles *16* or exposed shute strands passing [over] *under* three warp strands 12 is down and in contact with the suction box of the machine, *and the knuckles 18 or exposed shute strands passing over two adjacent warp strands are up and in contact with the paper web.* Thus the wear surface of the fabric 10 has been increased through longer and larger wear knuckles *16* formed by shute strands 14 which thereby provides additional working life for the fabric.

To be useful in a Fourdrinier section of a papermaking machine the fabric should have an air permeability of about 500 to 850 cubic feet per minute (CFM) per square foot of fabric at about one half inch water pressure drop. It has been found that a fabric having between 10 to 120 strands per inch, both in the warp and shute direction, provides sufficient permeability or porosity for water drainage. Since, as was stated above, the average cross machine direction strand diameter is larger than the machine direction strand diameter in the preferred fabric, preferably the number of machine direction strands per inch is greater than the number of cross machine direction strands per inch although it is within the scope of the present invention to have an equal number of less machine direction strands than cross machine direction strands per inch.

As with other known forming fabrics for papermaking machines, the fabric of the present invention can be flat woven and then formed into a seamed endless belt or the fabric can be woven directly into an endless belt. In addition, the fabrics in accordance with the present invention also may be utilized in papermaking applications other than a belt for a Fourdrinier section of a papermaking machine such as in wet felts and dryer felts.

While the above-described fabric in accordance with the present invention utilizes a so-called two-three type weave pattern, it is within the scope of the invention to provide fabrics having a greater number of strands per repetitive patterns such as three-three, three-four and the like.

The fabric of the present invention provides several advantages over known fabrics for use in papermaking machines. To be more specific, the two-three type fabric of this invention has an exceptionally long useful life, is able to run at high speeds and production rates, and significantly reduces the necessity for regrinding the covers of suction boxes. These advantages of the two-three fabric of the present invention may result from, among others, a significantly increased exposed wear surface in the fabric through longer wear knuckles and the use of larger diameter strands for both the warp and shute strands which causes less unit pressure on the suction box covers while the required air permeability of the fabric is retained.

The above-mentioned advantages are illustrated in the following specific example of a fabric in accordance with the present invention. It should be understood that the example is given for the purpose of illustration only and the example does not limit the invention as has heretofore been shown and described.

EXAMPLE

A fabric woven in accordance with the present invention was formed into an endless belt having a width of about 92 inches and a total length of about eighty feet. The fabric was made from polyester monofilament strands, the warp strands having an average diameter of about 0.0105 inches and the shute strands having an average diameter of about 0.013 inches. The fabric averaged about 56 warp strands per inch and about 40 shute strands per inch and had an air permeability of about 700 CFM per square foot of fabric.

The fabric belt was installed in a Fourdrinier machine used for making 26 to 36 pound corrugated medium and the machine ran at speeds of up to 1450 feet/minute. The belt was used for 108 days of machine operation as compared to approximately 60–65 days of operation for other belts used on the same machine. The belt had reached the end of its useful life due to an unrepairable hole in the belt. At certain periods during operation of the machines, the machine produced more corrugated medium per day than the machine had every produced previously with other types of fabric belts, in one particular month averaging about 158 tons of product per day. In addition, the polyethylene suction box covers of the machine required no grinding during the entire period which is in contrast to the conventional necessity of grinding the covers about every twenty days when using belts of other fabric types.

While the present invention has been described with reference to a particular embodiment thereof, it will be understood that numerous modifications may be made by those skilled in the art without actually departing from the spirit and scope of the invention as defined in the appended claims.

We claim:

1. A papermaking fabric comprising interwoven first machine direction and second cross-machine direction strands, the improvement in which the fabric constitutes a five-shed weave pattern wherein at least said second strands are woven in a repetitive pattern of passing [at cross-over points] under at least three adjacent first strands and then passing [at cross-over points] over at least two next adjacent first strands *and adjacent parallel second strands are offset one strand in the repetitive pattern* so as to form a $\frac{3}{2}$ *twill* type weave pattern, said second strands at one surface of the fabric being exposed [between said cross-over points thereat] as knuckles each having a length equal to [a group of five] *said at least three* adjacent first strands to thereby render said one surface substantially rough and wear resistant, and said second strands at the opposite surface of the fabric being exposed [between said cross-over points thereat] as knuckles each having a length equal to [a group of four] *said at least two next* adjacent first strands to thereby render said opposite surface likewise substantially rough and wear resistant, whereby the fabric at both said surfaces has improved paper pick-up characteristics as well as an improved working life.

2. The fabric according to claim 1, wherein both said first and second strands are interwoven in the repetitive pattern.

3. The fabric according to claim 1, wherein said first strands are woven in a repetitive pattern of passing at cross-over points over at least three adjacent second strands and then passing at cross-over points under at least two next adjacent second strands so as to form the 3/2 type weave pattern.

4. The fabric according to claims 1, 2 or 3, wherein said first and second strands each comprise a synthetic polymeric monofilament.

5. The fabric according to claim 3, wherein there are about 10 to about 120 of each said first and second strands per inch of the fabric.

*6. The papermaking fabric omprising interwoven first machine direction and second cross machine direction strands, the improvement in which the fabric constitutes a five-shed weave pattern wherein said second strands are woven in a repetitive pattern of passing under at least three adjacent first strands and then passing over at least two next adjacent first strands so as to form a $\frac{3}{2}$ type weave pattern, and said first strands are woven in a repetitive pattern of passing over at least three adjacent second strands and then passing under at least two next adjacent second strands so as to form the 3/2 type weave pattern, said second strand at one surface of the fabric being exposed as knuckles each having a length equal to said at least three adjacent first strands to thereby render one surface substantially rough and wear resistant and said second strands at the opposite surface of the fabric being exposed as knuckles having a length equal to said at least two next adjacent first strands to thereby render said opposite surface likewise substantially rough and wear resistant, whereby the fabric at both said surfaces has improved paper pickup characteristics as well as improved working life.*

*7. A papermakers fabric comprising interwoven first machine direction and second cross machine direction strands, the improvement in which the fabric comprises a six shed weave pattern wherein at least said second strands are woven in a repetitive regular twill pattern of passing over three and then under three of said first strands such that the knuckles of said second strands on opposite surfaces of said fabric are of approximately equal length, whereby the fabric has improved paper pick up characteristics and improved working life on both of said opposite surfaces.*

*8. A papermakers fabric according to claim 7 wherein said first machine direction strands are woven in a repetitive regular twill pattern of passing over three and then under three of said second strands such that the knuckles of said first strands on opposite surfaces of said fabric are of approximately equal length.*

*9. A papermaking fabric according to claim 7 wherein there are about ten to about one hundred twenty of each of said first machine direction strands and said second machine direction strands per inch of the fabric.*

*10. The papermakers fabric according to claim 7 wherein said first machine direction strands have a diameter of about 0.004 to about 0.030 inches and said second cross machine direction strands have a diameter of about 0.0045 to about 0.035 inches.*

*11. A papermakers fabric comprising interwoven first machine direction and second cross machine direction strands, the improvement in which the fabric comprises a seven shed weave pattern wherein at least said second strands are woven in a repetitive regular twill pattern of passing over at least three of said first strands and under the remainder of said first strands such that the knuckles of said second strands on opposite surfaces of said fabric have a difference in length not greater than one of said first strands, whereby the fabric has improved paper pick up characteristics and improved working life on both of said opposite surfaces.*

*12. A papermakers fabric according to claim 11 wherein said first machine direction strands are woven in a repetitive regular twill pattern of passing over at least three of said second strands and under at least three of second strands such that the knuckles of said first strands on opposite surfaces of said fabric have a difference in length not greater than one of said second strands.*

*13. The papermakers fabric according to claim 11 wherein said first machine direction strands have a diameter of about 0.004 to about 0.030 inches and said second cross machine direction strands have a diameter of about 0.0045 to about 0.035 inches.*

* * * * *

UNITED STATES PATENT AND TRADEMARK OFFICE

CERTIFICATE OF CORRECTION

PATENT NO. : Re. 33,195

DATED : April 10, 1990

INVENTOR(S) : Robert L. McDonald et al

It is certified that error appears in the above-identified patent and that said Letters Patent is hereby corrected as shown below:

The sheet of drawings, consisting of Figs. 1-3, should be deleted to be replaced with the sheet of drawings consisting of Figs. 1-3, as shown on the attached page.

Signed and Sealed this

Twenty-first Day of January, 1992

*Attest:*

HARRY F. MANBECK, JR.

*Attesting Officer*

*Commissioner of Patents and Trademarks*